May 18, 1965  R. B. WAY ETAL  3,183,696

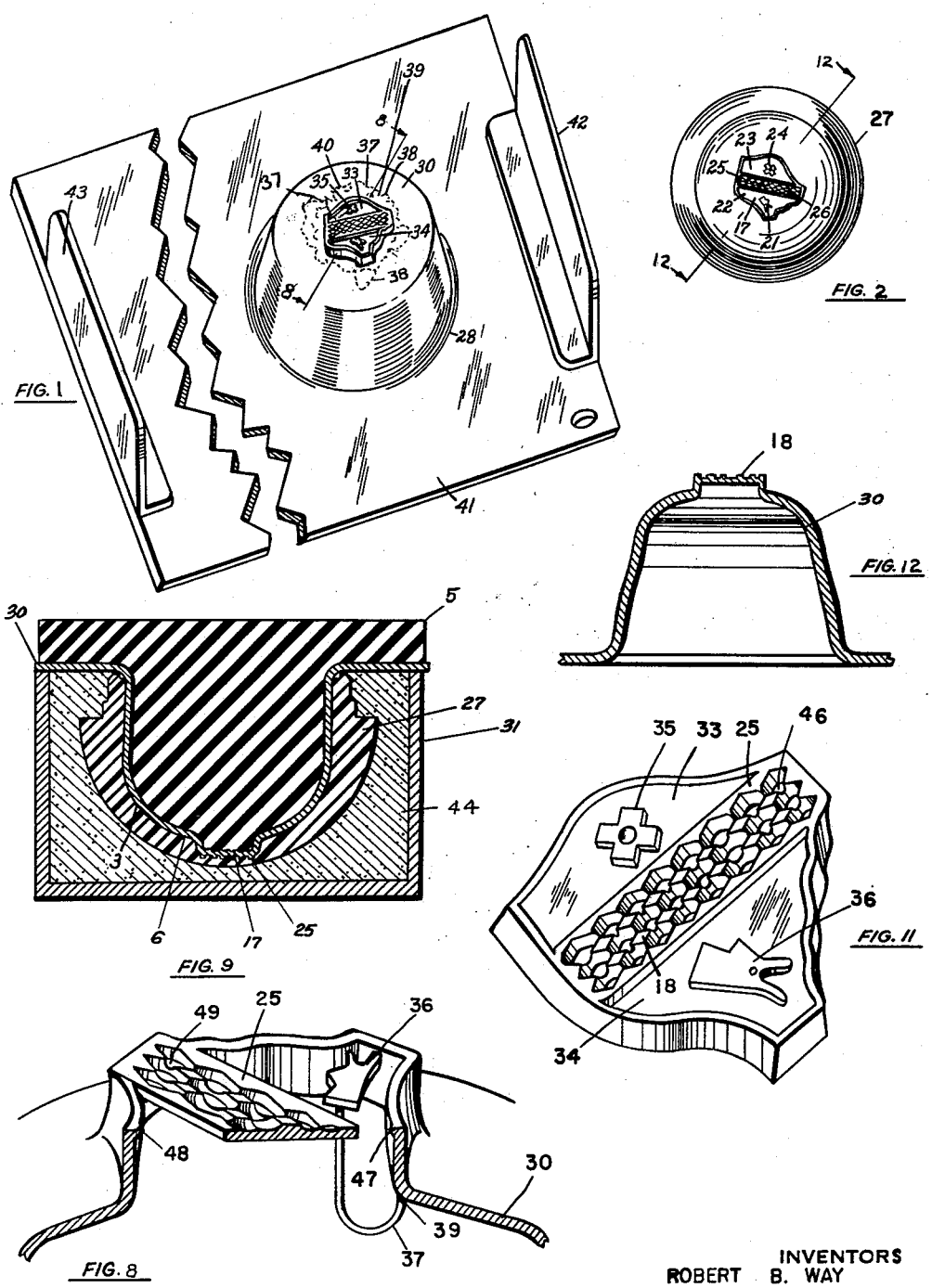

PROCESS FOR FORMING MASKS AND STENCILS

Filed June 2, 1958  3 Sheets-Sheet 3

INVENTORS
Robert B. Way
Carl D. Hessey
BY
Charles L. Lovercheck
atty

United States Patent Office 3,183,696
Patented May 18, 1965

3,183,696
PROCESS FOR FORMING MASKS AND STENCILS
Robert B. Way, 1503 Chelsea Ave., and Carl D. Hersey,
3107 Marvin Ave., both of Erie, Pa.
Filed June 2, 1958, Ser. No. 739,255
9 Claims. (Cl. 72—57)

This invention relates to forming devices and, more particularly, to methods and devices for forming paint masks and stencils.

This application is a continuation-in-part of application, Serial No. 403,341, filed January 11, 1954, now abandoned.

In the forming of paint masks and stencils for protecting various portions of an article of manufacture from being coated with paint on other predetermined areas during the painting process, the usual processes for forming the masks have been by the process commonly known as electroforming which concerns coating the article which is to have a mask formed to fit it with lacquer or graphite in order to provide an electrical conducting surface thereon and, thereafter, to electroplate a layer of metal over the surface. Thereafter, the material so electroplated which overlies portions of the article desired to be painted is cutout as shown in Patent No. 316,225, for example. This electroplating or electroforming process has proved to be quite expensive and time consuming and the masks or stencils resulting from the process are not strong and rigid, are relatively thick, and have frequently been unsatisfactory.

In the present invention, a sheet of metal is compressed and drawn into conformity with the surface of the article to be masked by means of a block of rubber or the like. It has been discovered that in making masks for articles which require a very deep draw and which have deep recesses on concave portions therein and have considerable detail in the surface thereof, a rubber material in engagement with the sheet of metal forming the mask will not expand the metal down into the deep narrow grooves. The rubber will leave small radii of the metal overlying sharp corners in recesses in the article. It is necessary in this case to form the metal sheet to generally conform to the shape of the surface of the article by means of a block of rubber on top of the sheet of metal to force it down into the approximate shape of the article.

If liquid had been used instead of rubber to preform or form the sheet to the approximate shape, the liquid would rush to the line of least resistance and the weaker spots of the metal would balloon out and rupture the metal. The rubber, however, does not act as a perfect liquid and the metal sheet is generally formed to the contour of the article. When the material of the sheet of metal has been approximately formed to the shape of the surface of the article being masked, a liquid pressure is applied to the sheet of metal which exerts a uniform pressure in all directions on the parts of the sheet overlying the concave portions formed in the sheet and the sheet is, therefore, made to conform intimately to the contour of the deep cavities and recesses in the article.

When the mask has been formed to fit intimately over the article by first the pressure applied by the rubber and then the pressure of liquid, the portions of the mask covering the parts of the article to be exposed to paint are removed by means of a jeweler's saw or the like with which the operator can follow the intimate detailed contours of the mask and saw out the metal therefrom which will overlie the areas of the article desired to be painted. Where isolated areas are to be masked, these small parts of the metal mask which would overlie the masked areas can be held in place by means of wires or bridges attached to the main body of the mask extending therefrom and then extending toward the mask in U-shaped form with the metal to cover the parts which are not to be painted held on the distal end of the wire.

It is, accordingly, an object of this invention to overcome the above and other defects in prior methods of forming paint masks and stencils and, more particularly, it is an object to provide a means for forming paint masks and stencils which is simple, economical to carry out, and results in an efficient product.

Another object of the invention is to provide a means for forming paint masks wherein pressure uniformly distributed over a sheet of metal which is to be used as a paint mask is applied to force the metal of the sheet into exact conformance with the surface of an article.

Still another object of the invention is to provide a method for forming paint masks wherein pressure applied by a hydraulic press or similar means is utilized in forming the paint masks.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 1 is an isometric view of a mask according to the invention;

FIG. 2 is a bottom view of an article to be painted;

FIG. 8 is a partial longitudinal cross sectional view taken on line 8—8 of FIG. 1 with the parts thereof removed to expose the parts of the article to be painted;

FIG. 9 is a cross sectional view taken on line 9—9 of FIG. 10;

FIG. 11 is an enlarged partial view of the mask covering the recessed area of the article; and FIG. 12 is a cross sectional view taken on line 12—12 of FIG. 2.

Figure 7:
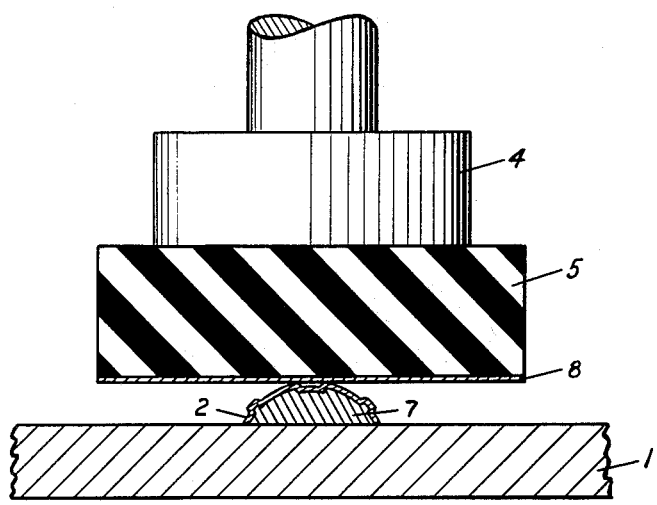
FIG. 7 is a view of the novel method showing a press ram and a paint mask material in position to form the first step of the method.

Now with more specific reference to the drawings, a table 1 is disclosed which may be the platen of a hydraulic press or similar device. A hollow article of manufacture which is to have a paint mask formed to conform to its outer surface is indicated at 2. A ram 4 of the hydraulic press or similar device has a large block of rubber 5 attached thereto. The rubber 5 is resilient so that it can be deformed when considerable pressure is applied to a local area thereof.

The hollow of the article 2 is filled with plaster, woods-metal, or similar material at 7 in order to prevent it from collapsing. A sheet of metal forming mask 8 made of copper, Phosphor bronze, or other material having suitable characteristics to allow it to take a permanent set is placed between the article 2 and the rubber 5 attached to the ram 4. Pressure is then exerted on the ram 4 to deform the rubber 5 to the approximate shape shown in FIG. 10 whereby the sheet of mask metal 8 is deformed to conform generally to the contour of the article 2 as indicated at 9.

Figure 4:
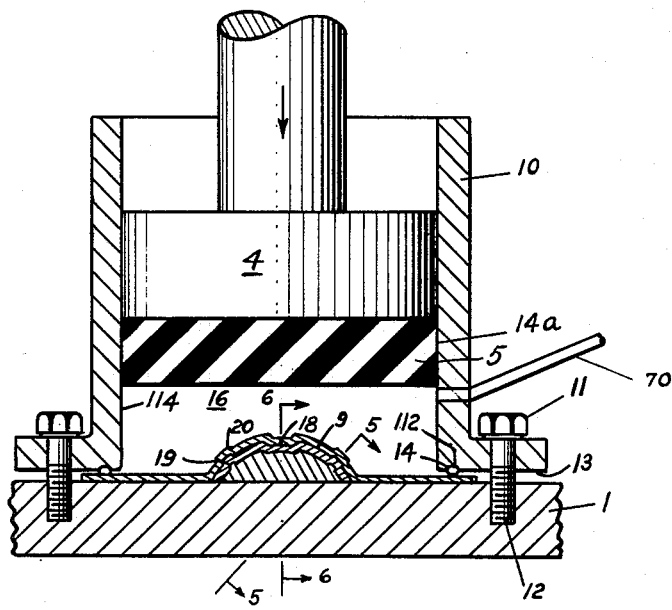
FIG. 4 shows the equipment set up to carry out the third step of the novel process.
Figure 5:
FIG. 5 is a cross sectional view taken on line 5—5 of FIG. 4.
Figure 6:
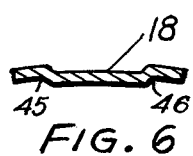
FIG. 6 is a cross sectional view taken on line 6—6 of FIG. 4.

If it is only required that the mask 8 conform very generally to the article or if the article is of relatively simple configuration, the process could stop at this point; however, where it is desired to have the mask conform in minute detail to the contour of the article or where the surface of the article has deep concavities and high convex portions, the process must be further carried out as indicated in FIG. 4.

In this further step, a cylinder 10 of steel or other strong material is clamped to the platen or table 1 of the press by means of bolts 11 which may be threaded into the table 1 at 12 or the cylinder 10 could be clamped to the table 1 in any other suitable manner. The cylinder 10 has a peripheral groove 112 in a lower surface 13 thereof and in the groove 112, an O-ring 14 is disposed. An inside edge opening 114 of the cylinder 10 then has the rubber 5 inserted therein ahead of the ram 4. The rubber 5 tightly conforms to the edges of the opening 114 of the cylinder 10. A space 16 below the cylinder 10 and the rubber 5 is then filled with oil. Pressure is then applied by means of the ram 4 and the pressure of the ram 4 on the oil is uniformly distributed over the surface of the mask 8, thereby forcing the mask 8 down into concave portions 18 and causing convex portions 19 to force the mask material out to a convex shape at 20 and into the concave portions 18. It has been found that in some cases, it is desirable and often necessary to substitute a light sponge rubber for the oil in the space 16. The sponge rubber acts very much like a liquid at high pressure.

Figure 10:
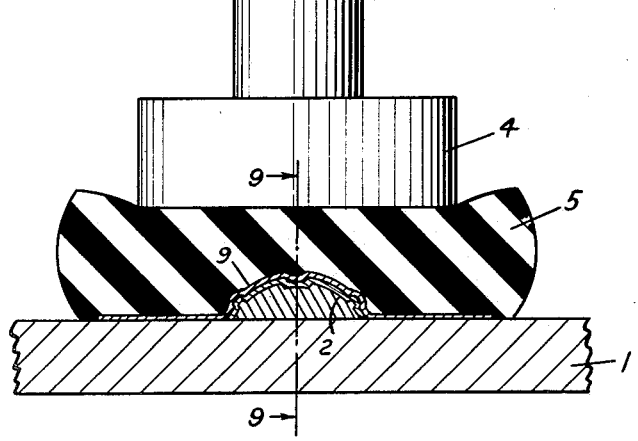
FIG. 10 shows the article on the press after the press has delivered a pressure to the mask material to carry out the second step of the novel method.
Figure 3:
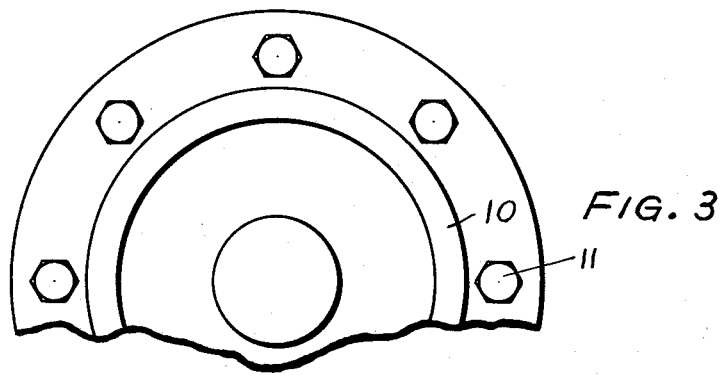
FIG. 3 is a top view of the device shown in FIG. 4.

After the step of the process shown in FIG. 10 has been performed, the process may be continued by clamping the ram 4 in place in the cylinder 10 and pumping oil through a pipe 70 at high pressure. The oil will enter the space 16 and be sealed therein by a sealing means 14a and the O-ring 14. The pressure will build up and force the mask material into the contours of the surface of the article. By carrying the process out in this manner, it is not necessary to provide a very large press for applying the force.

In some cases where the concave and convex surfaces of the article are extremely pronounced, it becomes necessary to apply a limited force to the cylinder, then remove the mask and anneal it, to remove strains due to work hardening, and then replace it in the cylinder and apply a greater force thereto. By applying a force, then removing it, and reapplying it repeatedly, it has been discovered that due to the freezing of the material of the mask, the material is work hardened and, therefore, has its properties considerably improved.

Figure 2A:
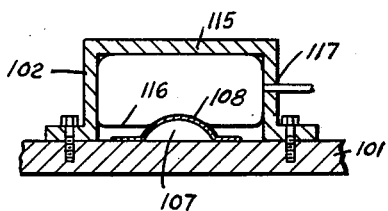
FIG. 2a is a cross sectional view of another embodiment of the invention.

On extremely large articles, it has been found desirable to provide a set-up similar to that shown in FIG. 2a wherein a table 101 is shown having a cylinder 102 bolted thereto or in some other suitable way attached. The top of the cylinder 102 is closed and an article 107 to be masked will be supported by suitable filler material. A mask material 108 is disposed over the article 107 and an air container 116 made of a resilient bag such as rubber is disposed therein having a nozzle 117 attached thereto which is connected to a high pressure pump or source of high pressure fluid.

The pressure from the pump expands the container 116 and brings it into contact with the mask material 108, applying a uniform pressure over the surface thereof to squeeze the mask into exact conformance with the article 107. By using a pump, the pressure which can be applied to the mask is dependent upon the pressure which the pump is capable of putting out rather than the volume of air displaced by it. Therefore, an extremely high pressure can be accomplished with very small equipment. The pressure capacity of the apparatus is dependent upon the strength of the cylinder 102 and on the pressure of the pump which it is capable of delivering.

A hollow article 27 shown best in FIG. 9 comprises a hollow cup shaped article made of transparent plastic in the form of a horn button for use on a modern automobile. The horn button is generally disposed at the center of a steering wheel of the automobile when in use. The article 27 has an outside hemispherical surface terminating in a peripheral stepped shoulder portion. The article 27 is made of transparent plastic material and has upwardly extending inside 3 and a bottom portion 6 with a recess 17 formed therein. The recess 17 is in the form of a concavity with depressions to give the appearance of a medieval English shield.

By painting an area 22 around a depressed area 21 indicating a deer's head, when the area 22 is painted, the deer's head will stand out as a clear plastic color in the painted background. The background area 22 may be painted green, for example. Likewise, an area 23 around the depressed area representing a cross 24 may be painted green, for example, so that the cross 24 stands out as a transparent area. Then a band area 25 may be painted another color and diamond shaped projected areas 26 in the band area 25 which are inwardly extending areas may be painted still another color by cutting out the metal of a member 30 which overlies them.

To form the mask over the embodiment of the invention shown in FIGS. 2 and 9, the thin sheet of metal 30 such as Phosphor bronze is laid over top of the article 27. The article 27 is supported on and backed up by means of plaster 44 or some other suitable material held in a suitable restraining device such as an enclosure by way of a steel box indicated at 31. The block of rubber 5 is then pressed down onto the sheet 30 by means of a hydraulic press and it forces the metal of the sheet 30 or draws it into the approximate shape of the inside surface of the article 27 in the cup shaped container shown. Then the rubber 5 is withdrawn and the partially formed member 30 is put in a cylinder as in FIG. 4 and the cylinder filled with oil with the edges of the member 30 clamped to the cylindrical container such as the cylinder 10 in FIG. 4 with the plaster 44 supporting the article 27. The ram 4 is then brought down which applies a force to the liquid which transmits the force to the sheet member 30 which forces the metal to fit intimately into the recesses 17 in the recess formed by the band area 25 with raised portions overlying the diamond shaped raised areas 26.

It would have been impractical to have carried out the finishing step to force the metal down into the area between the diamond shaped areas 26 by means of the rubber block 5 because a considerably greater pressure would have been required to force the metal into these concave areas and around the convex areas. It has been discovered by tests that the pressure required to finish the mask at the final stages can be reduced as much as ninety percent by substituting a liquid for rubber at the final stages of forming the block.

When the material of the member 30 covering the areas to be painted is removed by means of a jeweler's saw or the like, areas 33 and 34, for example, are removed by sawing around the boundaries of these areas. The edges of the cut metal of the member 30 may then be polished. Then a cross shaped metal 35 and a deer head shaped metal 36 become separate pieces and are unsupported. They may be supported by means of U-shaped wires 37 and 38 which may be soldered to the member 30 at 39 and 40, respectively. The member 30 is set onto a plate 41 in a recess 28 therein and the metal 30 is soldered to the plate 41. The plate 41 has handles 42 and 43 attached thereto for convenience in transporting the device.

If a mask for putting in recesses representing the band area 25 is to be made, the areas 33 and 34 are not sawed out and areas 46 are sawed out, thus forming openings in the areas 46 for paint to pass through and be deposited on the articles through diamond shaped areas 49. It will be noted that the metal at 47 and 48 is formed inwardly to provide a sharp lip to make a sharp line of demarcation in the paint where sprayed on at the edge of a painted area. This is possible because of the metal formed by the liquid pressure which intimately forces the metal of the member 30 into all crevices and corners of the article.

When it is desired to paint an article with the mask shown in FIGS. 1, 11, and 12, it is merely necessary to invert the mask and set an article 27, such as that shown in FIGS. 2 and 9, on top of the member 30. Then the paint can be sprayed over the inside of the member 30 and the paint will be deposited on the areas 22 and 23 exposed through the openings in the member 30.

In order to paint other areas of the device another color, it is merely necessary to use a mask such as that shown made of metal as the member 30 with the sawed out areas 46 of the metal overlying other areas to be painted. Then by viewing the transparent horn button from the convex side, it has the appearance of being made of a plurality of colors of plastic. It will be noted in FIGS. 1 and 9 that the metal at 18 is pushed down into intimate contact with recesses in the article and that by sawing out the lowermost portion, the lips 47 and 48 remain and the metal therebetween being removed, the lips 47 and 48 will prevent paint from being deposited on the side walls of the recesses in the article.

This sort of lip will remain in the mask formed from the sheet 30 when the metal is properly sawed out. A mask having the deep recesses represented by the number 30 and the areas 46 is difficult to form of thin strong metal in any manner other than that set forth herein.

The foregoing specification sets forth the invention in its preferred practical forms but it will be seen that the structure shown is capable of modification within a range of equivalents without departing from the invention which is to be understood is broadly novel as is commensurate with the appended claims.

The embodiments of the invention in which an exclusive property or privilege is claimed are defined as follows:

1. A method for forming a stencil to strictly conform to the contour of the surface of a hollow article of manufacture having concave and convex areas on one side thereof and comprising providing a supporting surface, filling said hollow of said article with a rigid material, disposing a sheet of a relatively thin, ductile material of a type which stiffens and develops resiliency when it is cold worked over the opposite side of said article from the side where said rigid material is disposed, forcing a resilient deformable member into engagement with said deformable material whereby said deformable material is cold worked and stiffens and develops a resiliency which tends to return it to the shape of said surface if it becomes dented or bent whereby it is deformed to conform generally to the contour of said concave and said convex surfaces of said article with edges of said deformable material extending outwardly beyond the edges of said article and into engagement with said supporting surface, removing some of said sheet material to form openings in said formed stencil over predetermined areas of said article, moving said resilient member from engagement with said article, disposing a cylinder around said article with one end of said cylinder in engagement with said edges of said rigid material, providing sealing means between the end of said cylinder and the edges of said rigid material, clamping said cylinder into engagement with said supporting surface, filling said cylinder above said stencil with a material having the properties of a fluid, disposing a piston in said cylinder, and applying a force to said cylinder to compress said fluid like material on said stencil whereby said stencil material is forced into conformance with the contours of said article.

2. The method recited in claim 1 wherein said fluid like material is oil.

3. The method recited in claim 1 wherein said fluid like material is sponge rubber.

4. The method recited in claim 1 wherein the force is applied to said piston by means of a hydraulic press.

5. The method recited in claim 1 wherein the force to said cylinder is applied, then released, then applied and released repeatedly to cause said stencil material to freeze and, therefore, work-harden.

6. The method recited in claim 5 wherein the force is applied to said cylinder to partially deform said stencil, then is removed and annealed, and a greater force is applied to said cylinder.

7. A method for forming a stencil to strickly conform to the contour of the surface of a hollow article of manufacture having concave and convex areas on one side thereof and comprising providing a supporting surface, filling said hollow of said article with a rigid material, disposing a sheet of a relatively thin, ductile material of a type which stiffens and develops resiliency when it is cold worked over the opposite side of said article from the side where said rigid material is disposed, forcing a resilient deformable member into engagement with said deformable material whereby said deformable material is cold worked and stiffens and develops a resiliency which tends to return it to the shape of said surface if it becomes dented or bent whereby it is deformed to conform generally to the contour of said concave and said convex surfaces of said article with edges of said deformable material extending outwardly beyond the edges of said article and into engagement with said supporting surface, removing some of said sheet material to form openings in said formed stencil over predetermined areas of said article, moving said resilient member from engagement with said article, disposing an enclosure around said article with one end of said enclosure in engagement with the edges of said stencil material, providing sealing means between the end of said enclosure and the edges of said stencil material, clamping said enclosure in engagement with said supporting surface, filling said enclosure above said stencil with a material having the properties of a fluid, and pumping fluid under pressure into said enclosure above said stencil whereby said stencil is forced into conformance with said article.

8. A method of forming a stencil to strictly conform to the contour of the surface of a hollow article of manufacture having concave and convex areas on one side thereof and comprising providing a supporting surface, filling said hollow of said article with a rigid material, disposing a sheet of a relatively thin, ductile material of a type which stiffens and develops resiliency when it is cold worked over the opposite side of said article from the side where said rigid material is disposed, forcing a resilient deformable member into engagement with said deformable material whereby said deformable material is cold worked and stiffens and develops a resiliency which tends to return it to the shape of said surface if it becomes dented or bent whereby it is deformed to conform generally to the contour of said concave and said convex surfaces of said article with edges of said deformable material extending outwardly beyond the edges of said article and into engagement with said supporting surface, removing some of said sheet material to form openings in said formed stencil over predetermined areas of said article, moving said resilient member from engagement with said article, disposing an enclosure around said article with one end of said enclosure in engagement with the edges of said stencil material, providing sealing means between the end of said enclosure and the edges of said stencil material, clamping said enclosure into engagement with said supporting surface, filling said enclosure above said stencil with a material having the properties of a fluid, disposing a resilient container in said enclosure, and pumping fluid under pressure into said container whereby said stencil is forced into conformance with said article.

9. A process of forming a stencil for use in painting an article to strictly conform to the contour of the surface of a hollow article of manufacture having concave and convex areas on one side thereof, said process comprising providing a supporting surface, filling said hollow of said article with a rigid plaster material, disposing a sheet of relatively thin, ductile, deformable material of a type that stiffens and develops a resiliency when it is cold worked over the opposite side of said article from the side where said rigid material is disposed, forcing a resilient deformable member into engagement with said deformable metallic material whereby said deformable metallic material is deformed to conform intimately to the contour of said concave and said convex areas of said article with the edges of said deformable material extending outwardly beyond the edges of said article and into engagement with said supporting surface whereby said material is cold worked and it stiffens and develops a resiliency, moving said resilient member from engagement with said deformable metallic material, disposing a cylinder around said article with one end of said cylinder in engagement with said edges of said deformable material, providing sealing means between the end of said cylinder and the edges of said deformable material, clamping said cylinder into engagement with said supporting surface, filling said cylinder above said stencil with a liquid, disposing a piston in said cylinder, applying a force to said cylinder to exert a pressure on said liquid on said stencil whereby said deformable material is forced into conformance with the contours of said article, cutting out areas of said stencil which overlie predetermined areas of said article by means of a jeweler's saw whereby paint may be deposited on said article through said cut out areas, said cut out areas being adapted to overlie the bottom of predetermined areas of said article, and polishing the said cut edges.

References Cited by the Examiner
UNITED STATES PATENTS

| | | | |
|---|---|---|---|
| 318,943 | 6/85 | Beck | 101—127 |
| 630,771 | 8/99 | Blackwell | 76—107 X |
| 2,066,085 | 12/36 | Whistler | 29—421 X |
| 2,168,406 | 8/39 | Harris. | |
| 2,292,462 | 8/42 | Milford | 113—44 |
| 2,749,867 | 6/56 | Engel | 113—44 |
| 2,762,734 | 9/56 | Corral | 113—44 |
| 2,863,384 | 12/58 | Rich | 101—127 |

WILLIAM B. PENN, *Primary Examiner.*

W. A. WILTZ, ROBERT A. LEIGHEY, DAVID KLEIN, ROBERT E. PULFREY, *Examiners.*